United States Patent
Ansari

(10) Patent No.: US 11,005,907 B2
(45) Date of Patent: May 11, 2021

(54) SINGLE STREAM FORMAT FOR MULTIPLE DISPLAY MODES

(71) Applicant: INTEL CORPORATION, Santa Clara, CA (US)

(72) Inventor: Nausheen Ansari, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/225,214

(22) Filed: Dec. 19, 2018

(65) Prior Publication Data

US 2019/0222625 A1 Jul. 18, 2019

(51) Int. Cl.
| | |
|---|---|
| *G06F 15/16* | (2006.01) |
| *H04L 29/06* | (2006.01) |
| *G09G 5/00* | (2006.01) |
| *H04N 21/4363* | (2011.01) |
| *H04N 21/4408* | (2011.01) |

(52) U.S. Cl.
CPC ........... *H04L 65/608* (2013.01); *G09G 5/006* (2013.01); *H04L 65/601* (2013.01); *H04L 65/605* (2013.01); *H04L 65/607* (2013.01); *H04N 21/43632* (2013.01); *H04N 21/4408* (2013.01); *G09G 2370/10* (2013.01)

(58) Field of Classification Search
CPC ... H04L 65/608; H04L 65/605; H04L 65/607; H04L 65/601; H04N 21/4408; H04N 21/43632; G09G 5/006; G09G 2370/10
See application file for complete search history.

(56) References Cited

U.S. PATENT DOCUMENTS

| | | | | |
|---|---|---|---|---|
| 6,611,532 B1* | 8/2003 | Madour | ............... | H04Q 3/0045 370/238 |
| 6,675,208 B1* | 1/2004 | Rai | ................... | H04W 12/0013 709/224 |
| 6,987,985 B2* | 1/2006 | Purkayastha | ..... | H04W 36/0066 455/552.1 |
| 7,245,615 B1* | 7/2007 | Potter | ..................... | H04L 69/16 370/386 |
| 2002/0057662 A1* | 5/2002 | Lim | ........................ | H04L 69/16 370/338 |
| 2003/0137985 A1* | 7/2003 | Koyanagi | ........... | H04L 12/6418 370/401 |
| 2009/0109995 A1* | 4/2009 | Alam | .................... | H04W 84/18 370/463 |
| 2011/0207434 A1* | 8/2011 | Rozhkov | ................. | G06F 21/31 455/411 |
| 2012/0066425 A1* | 3/2012 | Zeng | ........................ | G06F 13/14 710/303 |
| 2013/0242984 A1* | 9/2013 | Lee | .......................... | H04L 49/15 370/386 |
| 2014/0115192 A1* | 4/2014 | Hunkins | ................. | G06F 13/24 710/8 |

(Continued)

*Primary Examiner* — Richard G Keehn
(74) *Attorney, Agent, or Firm* — Kacvinsky Daisak Bluni PLLC

(57) ABSTRACT

Disclosed herein are techniques to provide a unified display stream for multiple modes of a display specification. The display stream can include a link layer control protocol packet comprising link control information inserted between a set number of packets comprising display data. A packet can comprise indications of display data for a single stream or multiple streams.

20 Claims, 6 Drawing Sheets

(56) References Cited

U.S. PATENT DOCUMENTS

| | | | | |
|---|---|---|---|---|
| 2015/0025917 A1* | 1/2015 | Stempora | ............... | G06Q 40/08 |
| | | | | 705/4 |
| 2015/0189109 A1* | 7/2015 | Whitby-Strevens | ...... | G06F 3/14 |
| | | | | 348/207.1 |
| 2015/0280895 A1* | 10/2015 | Whitby-Strevens | ... | G09G 5/006 |
| | | | | 375/354 |
| 2018/0288426 A1* | 10/2018 | Glen | .................... | H04N 19/182 |
| 2019/0132229 A1* | 5/2019 | McCormack | ........... | H04L 47/34 |

* cited by examiner

SINGLE STREAM FORMAT FOR MULTIPLE DISPLAY MODES

TECHNICAL FIELD

Embodiments described herein generally relate to display stream protocols and particularly to formatting display streams for different operation modes.

BACKGROUND

Display streams are typically formatted according to a specification in which the display is operating to communicate the stream. For example, the DisplayPort specification provides details for both an interconnect and stream formation for communicating image and audio information via packetized data transmission. DisplayPort can be provided for both internal and external display connections. Modern DisplayPort specifications provides two modes of operation, single stream transport (SST) mode and multi-stream transport (MST) mode. Both SST and MST provide a 64-symbol packet. However, with MST, the first symbol of each packet is a header which serves multiple purposes. As such, the data stream must be formatted differently for SST mode and MST mode. Furthermore, the header in MST mode contributes about 1.5% overhead to each packet.

DETAILED DESCRIPTION

The present disclosure is generally directed to eliminating the overhead requirements of the packet header and provide a single stream format for both SST and MST modes. In some examples, the present disclosure may be implemented by a device operating in accordance with a display specification, such as, for example, the DisplayPort standard promulgated by the Video Electronics Standards Association (VESA). As a specific example, the present disclosure could be implemented by devices operating in accordance with the DisplayPort Standard version following version 1.4, which is yet to be announced at the time of filing of this application.

In general, the present disclosure provides a display stream for both SST and MST modes where the packets do not have a header. Instead of using a header, link-layer related control information is communicated from the transmitter to the receiver at allocation of the link and/or in packets inserted in the stream at fixed intervals. With some examples, the packers can be encoded using 128b-132b encoding.

The present disclosure provides display panels and display source circuitry, and techniques to format a display stream compatible with multiple display modes (e.g., SST, MST, etc.) where the display stream does not use a header in each packet. This disclosure provides advantages over prior techniques in that different formats were required for each mode and significant overhead was occupied with the packet header.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
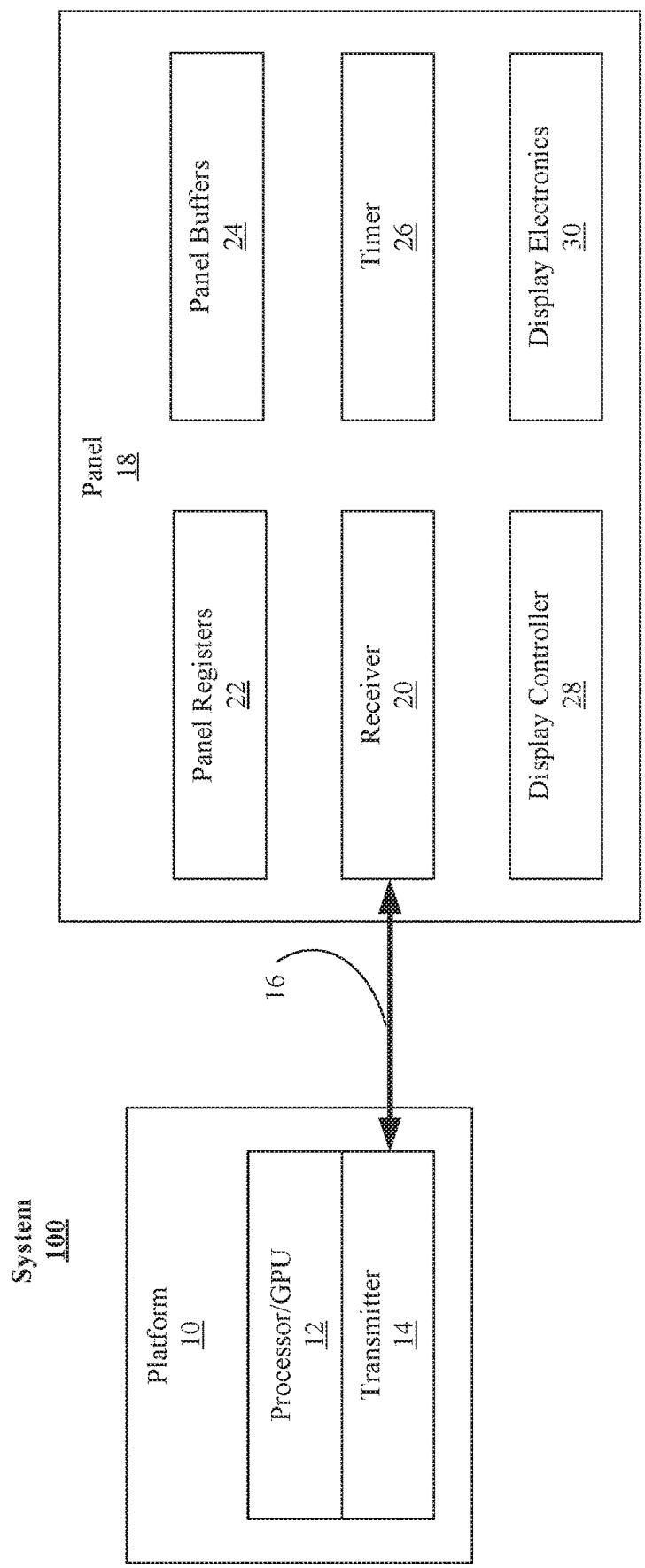
FIG. 1 illustrates an embodiment of a display system.

FIG. 1 illustrates a display system 100, arranged according to at least one embodiment of the disclosure. As depicted, the display system 100 includes a platform 10 and a panel 18 coupled by a display interface 16. In general, the platform 10 can comprise any platform arranged to generate images to be displayed by the panel 18. For example, the platform 10 could be integrated into, part of, or comprise, a laptop computer, a desktop computer, an ultrabook, a cellular telephone, or any processor-based device. In general, panel 18 can be integrated into, part of, or comprise, any of a variety of displays, such as, light emitting diode (LED) displays, organic LED (OLED) displays, liquid crystal displays (LCD), or the like. Display interface 16 may be any of a variety of display interfaces, such as, for example, a DisplayPort interface, an embedded DisplayPort interface, or the like. It is noted, that the present disclosure provides numerous examples in the context of display streams for a DisplayPort interface. This is done for convenience and clarity of presentation. However, the techniques described herein could be implemented for other interfaces, besides DisplayPort. Examples are not limited in this context.

The platform 10 may have a processing unit 12, which can be a conventional processor, a graphics processing unit (GPU) or a combination of conventional processor and GPU. Platform 10 further includes a transmitter 14. Processor 12 and transmitter 14 may constitutes a display engine. Platform 10 may be provided as a System-on-Chip (SoC), such as may be integrated into a display system device (e.g., mobile phone, laptop, portable media device, etc.). In general, platform 10 sends images to panel 18 via display interface 16. Panel 18 can then display the images. For example, platform 10 can send, via transmitter 14 and display interface 16, information elements including indications of pixel data (e.g., color, locations, etc.) generated by GPU 12 to panel 18. Such information elements (or "frames") often formatted into a display stream and sent as a stream of packets to panel 18. This is described in greater detail below. In general, however, the display stream formatted by platform 10 will include a link layer control protocol (LLCP) packet and a multi-stream transport packet (MTP). The LLCP packet can be a set number of bits (e.g., 128) and can be arranged to indicate control information for the display stream. For example, the LLCP packet can convey information conveyed in a packet header using conventional display streams. The MTP is defined as a set number of symbols (e.g., 64) without a header and indicates display information (e.g., image data, audio data, etc.). Panel 10 formats a display stream including a number of MTPs with an LLCP inserted at fixed intervals between MTPs. For example, a display stream could be formatted including an LLCP packet inserted every $2^{16}$ symbols (e.g., every 1024 MTPs, or the like).

Panel 18 may include a receiver 20, panel registers 22, panel buffers 24, timer 26, display controller 28 and display electronics 30. In general, panel 18 can receive a display stream (e.g., from platform) at receiver 20 via display interface 16. Receiver 20 can provide the display stream to display controller 28, which in turn, decodes the display stream and provides image data (e.g., frames) for display on display electronics 28. Receiver 20 and/or display electronics may have access to panel registers 22, which may store indications of settings for panel 18 (e.g., refresh rate, etc.). Timer 24 can be coupled to receiver 20 and/or display controller 28 and can operate to provide an expiration of a frame refresh interval, or expiation of a period where the display interface 16 link is shut down to conserve power, for example, when the panel 18 is operating in a self-refresh mode, sometimes referred to as panel self-refresh (PSR).

Panel buffer 24 provides memory storage for image information (e.g., frames, or the like) received via display interface 16. Display controller 28 can operate to shut down portions of panel (e.g., receiver, or the like) during periods of PSR and can refresh display electronics from indications of the frame stored in panel buffers 24.

Figure 2:
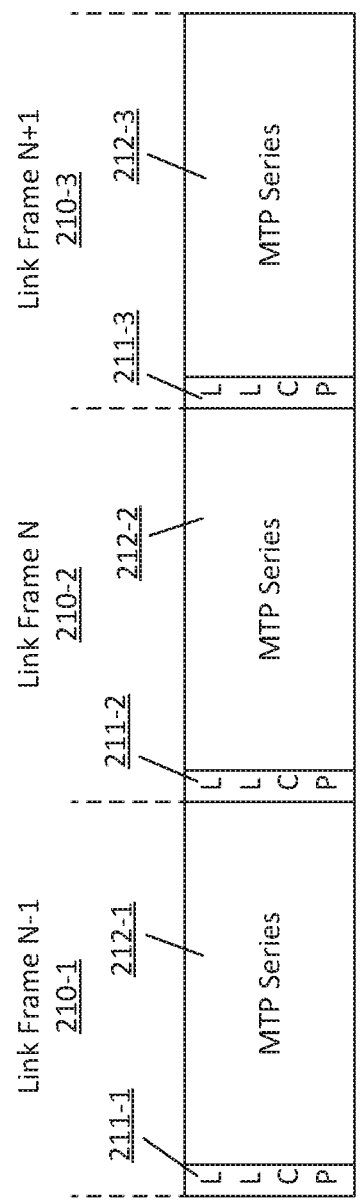
FIG. 2 illustrates a first frame update schedule.

FIG. 2 illustrates an example display stream 200, arranged according to examples of the present disclosure. As depicted, the display stream 200 includes a number of link frames 210-$n$, where n is a positive integer. For example, three (3) link frames 210-1, 210-2 and 210-3 are depicted, corresponding to link frame N−1, link frame N, and link frame N+1, respectively. Each link frame 210-$n$ includes an LLCP packet 211-$n$ and a series of MTPs 212-$n$. For example, link frame 210-1 includes LLCP packet 211-1 and MTPs series 212-1; link frame 210-2 includes LLCP packet 211-2 and MTPs series 212-2; and link frame 210-3 includes LLCP packet 211-3 and MTPs series 212-3.

With some examples, display stream 200 can be encoded using a line code, which maps patterns of voltage, current, or photons to digital transmissions. For example, 8b/10b is a common line code and display stream 200 may be encoded using 8b/10b. As another example, display stream 200 may be encoded using the 64b/66b encoding scheme or 128b/132b encoding scheme. As such, display stream 200 can be represented or discussed in terms of symbols. With some examples, only portions of display stream 200 are encoded, for example, only MTP series 212-$n$ may be encoded.

In some examples, LLCP packet 211-$n$ can include indications of link layer control information for panel 18. For example, LLCP packet 211-$n$ can include an indication of a scrambler reset (SR), which resets the scrambler and marks the link frame boundary. With some examples, the LLCP packet 211-$n$ can be inserted every $2^{16}$ symbols and can operate as the SR signal. In some examples, the SR signal can be moved to the logical physical (PHY) layer and conveyed in a PHY layer control packet as opposed to the display stream 200.

With some examples, LLCP 211-$n$ can include an indications of an allocation change trigger (ACT), which indicates a change in stream configuration. For example, the ACT can include an indication to enable or disable a stream or a change in encryption status. LLCP 211-$n$ can include an indications of an encryption control field (ECF), which indicates whether to enable or disable encryption of the link through ECF [0] as well as whether to enable or disable the XOR status of each individual symbol in the stream via ECF [1:63]. LLCP 211-$n$ can include an indications of a link verification pattern (LVP), which can be used for link integrity checks, and may be required to be sent periodically at fixed intervals.

Figure 3:
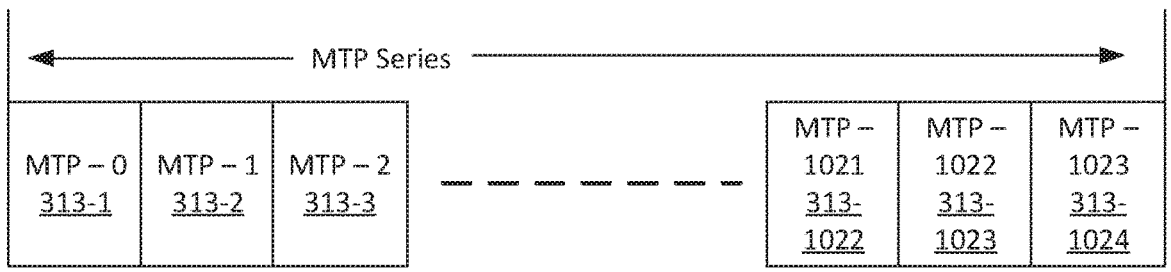
FIG. 3 illustrates a second frame update schedule.

Each MTP series 2122-$n$ can include a number of MTP frames. FIG. 3 illustrates an example MTP series 312, arranged according to examples of the present disclosure. In general, MTP series 312 can be any one of MTP series 212-$n$ from FIG. 2. As depicted, the MTP series 312 includes a number of individual MTPs 313-$m$, where m is a positive integer. In some examples, each MTP can include 64 symbols. In the specific example, where each MTP includes 64 symbols and the LLCP packet is inserted every $2^{16}$ symbols, there each MTP series 312 will include 1024 individual MTPs. Such an example is depicted in this figure. MTP series 312 includes MTP-0 through MTP-1023 or MTP 313-1, MTP 313-2, MTP-313 to MTP 313-1022, MTP 313-1023 and MTP 313-1024.

As noted, a primary advantage of the display stream of the present disclosure is the convergence of multiple modes into a single display stream format. For example, DisplayPort SST mode and DisplayPort MST mode can both be represented in the unified display stream described herein. That is, each MTP can be used to convey display information for either SST mode (e.g., see FIG. 4A) or MST mode (e.g., see FIG. 4B). Furthermore, the link control information for the respective mode is provided in the LLCP, as described above.

Figure 4A:
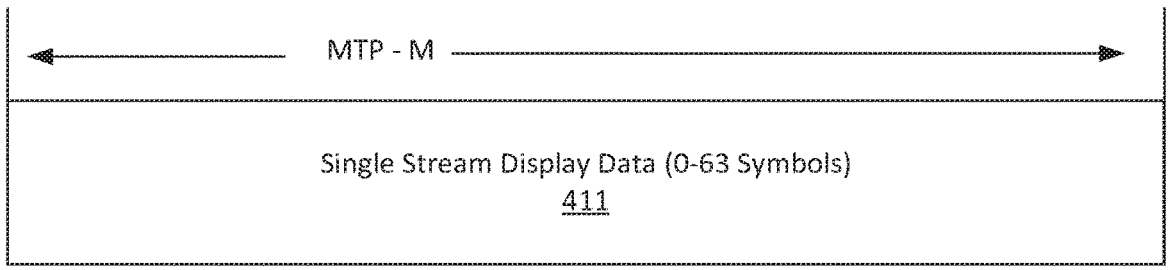
FIG. 4A illustrates a first multi-stream transport packet.
Figure 4B:
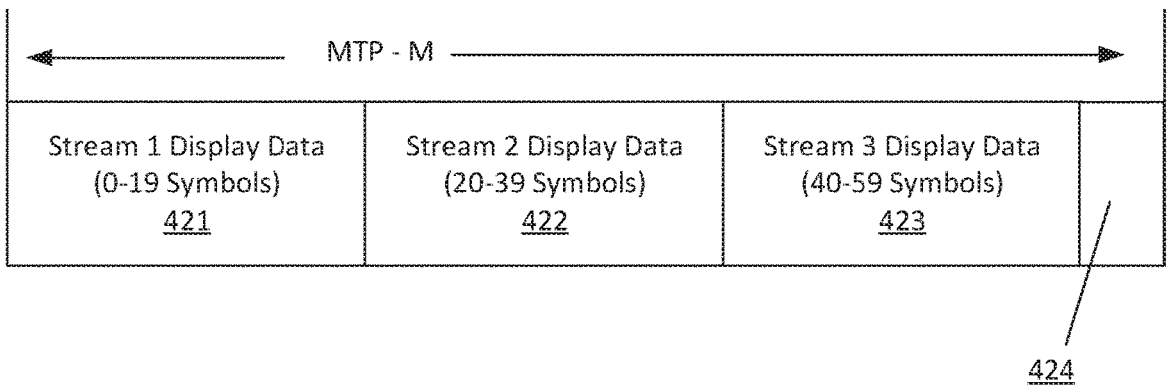
FIG. 4B illustrates a second multi-stream transport packet.

FIGS. 4A and 4B illustrate example MTPs corresponding to either an SST mode or an MST mode. For example, FIG. 4A illustrates an example MTP 401 that may be used for an SST mode while FIG. 4B illustrates an example MTP 402 that may be used for an MST mode. Turning more particularly to FIG. 4A, MTP 401 comprises indications of display data (e.g., image data, image and audio data, etc.) for a single stream 411, and can comprise 64 symbols.

Turning more particularly to FIG. 4B, MTP 402 comprises indications of display data (e.g., image data, image and audio data, etc.) for multiple streams. For example, this figure depicts MTP 402 comprising indications for three (3) streams. Specifically, MTP 402 includes indications of display data for a first stream (e.g., Stream 1) 421, indications of display data for a second stream (e.g., Stream 2) 422, and indications of display data for a third stream (e.g., Stream 3) 423. In some examples, MTP 402 can comprise 64 symbols where each stream is conveyed in 20 symbols. As such, 4 symbols remain unused. In such an example, MTP 402 can include padding 424 (e.g., all zeros, or the like).

In some examples, the display stream 200 (and particularly the display data for multiple streams depicted in FIG. 4B) can be used to convey display information for tiled displays. For example, display data for a stream corresponding to each tile can be provided in each MTP 402 of the MTP series 312 of the display stream 200.

Figure 5:
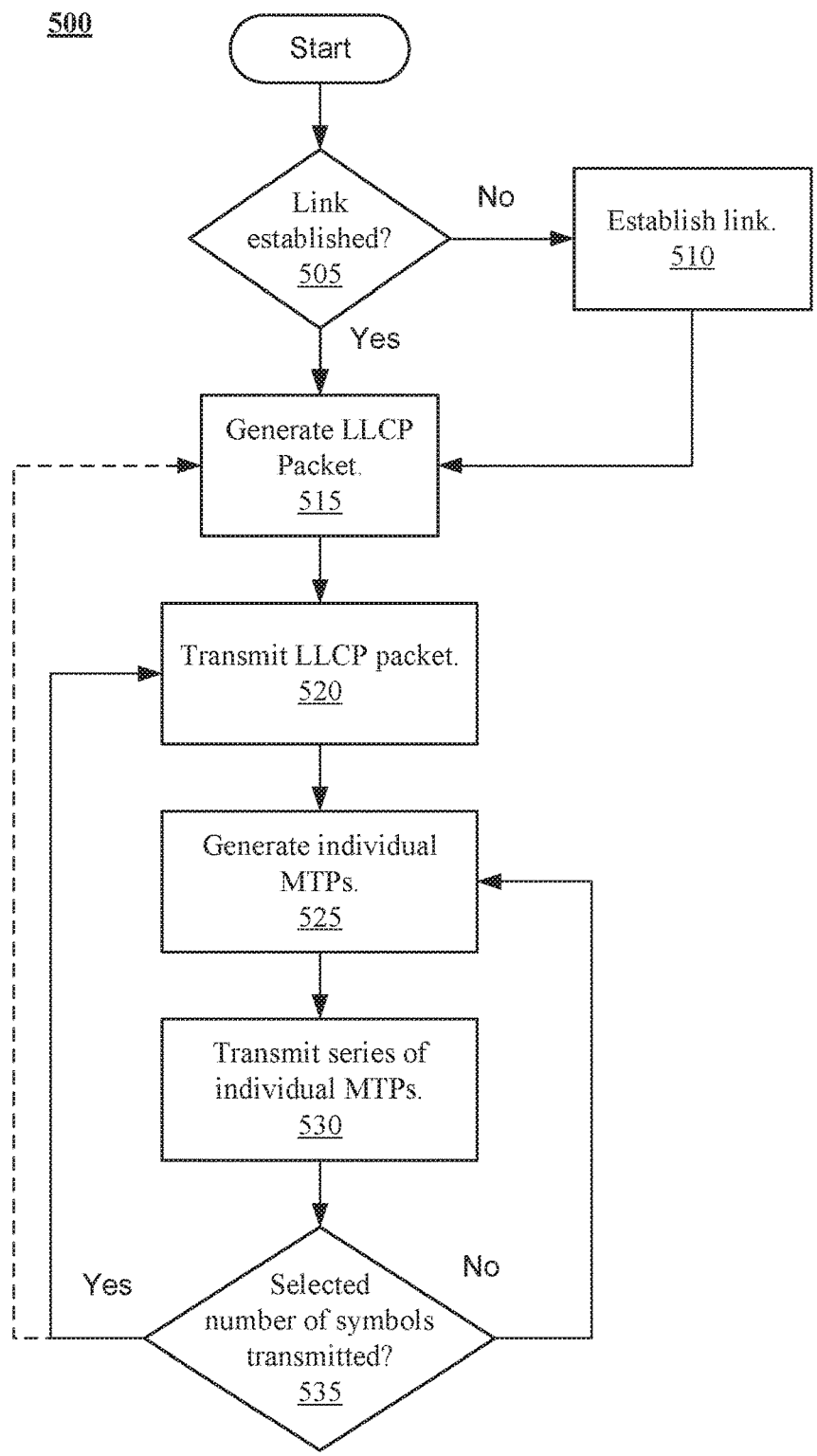
FIG. 5 illustrates a logic flow.

FIG. 5 illustrates a logic flow 500 for formatting a display stream. Logic flow 500 can be implemented by a platform coupled to a panel, such as, for example, platform 10 coupled to panel 18. Logic flow 500 can begin at decision block 505. At decision block 505 "link established" the platform can determine whether a link with a panel has been established. For example, platform 10 can determine whether a link with panel 18, such as via interface 16, has been established. In some examples, the link can be a link in accordance with a DisplayPort standard. From decision block 505, logic flow 500 can continue to either block 510 or block 515. For example, logic flow 500 can continue from decision block 505 to block 515 based on a determination that the link has been established. Conversely, logic flow 500 can continue from decision block 505 to block 510 based on a determination that the link has not been established.

At block 510 "establish link" the platform can establish a link with a panel. For example, platform 10 can establish a link (e.g., a DisplayPort link, or the like) with panel 18 via interface 16. At block 515 "generate LLCP packet" the platform can generate a LLCP packet including control information. For example, platform 10 can generate an LLCP packet 211 including indications of control information (e.g., an ACT, ECF, LVT, etc.). Continuing to block 520 "transmit LLCP packet" the platform can transmit the LLCP packet. For example, transmitter 14 of platform 10 can transmit LLCP packet 211 to transmitter 20 at panel 18.

Continuing to block 525 "generate individual MTPs" the platform can generate individual MTPs including indications of display data. For example, platform 10 can generate individual MTPs 313 including indications of display data. As a specific example, where the link is operating in SST mode, then the individual MTPs 313 will include display data for a single display stream 411. In other examples, where the link is operating in MST mode, then the individual MTPS 313 will include display data for multiple display streams (e.g., 421, 422, 423, etc.).

Continuing to block 530 "transmit series of individual MTPs" the platform can transmit the individual MTPs. For example, transmitter 14 of platform 10 can transmit MTP series 212 to transmitter 20 at panel 18. Continuing to decision block 535 "selected number of symbols transmitted?" the platform can determine a selected or predetermined number of symbols has been transmitted in MTP series. For example, platform 10 can determine whether the MTP series transmitted at block 530 includes a predetermined number of symbols (e.g., 2^16, or the like) has been transmitted in MTP series 212. From decision block 535, logic flow 500 can return to either block 525 or one of blocks 515 or 520. For example, logic flow 500 can return to block 525 from decision block 535 based on a determination that the predetermined number of symbols has not been transmitted. Specifically, logic flow can return to block 525 to continue generating and transmitting MTPs as part of the series. Conversely, logic flow 500 can return to either block 515 or 520 from decision block 535 based on a determination that the predetermined number of symbols has been transmitted. In some examples, logic flow 500 can return to block 515 to regenerate the LLCP packet (e.g., where a control parameter has changed, or the like) or return to block 520 to resend the LLCP packet.

Figure 6:
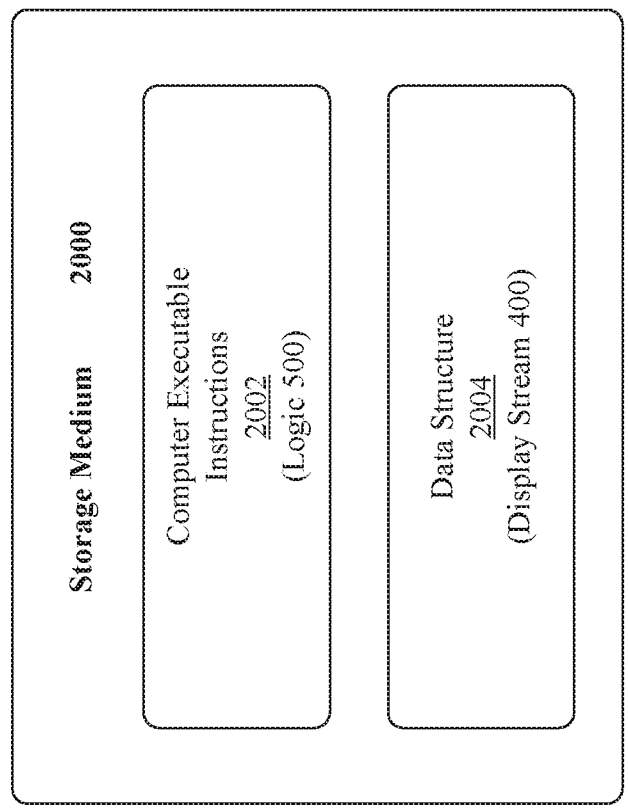
FIG. 6 illustrates one embodiment of a storage medium.

FIG. 6 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions (e.g., 2002). For example, the storage medium 2000 may store various types of computer executable instructions to implement logic flow 500. The storage medium 2000 may store various types of data structures computer executable instructions (e.g., 2004). For example, the storage medium 2000 may store various types of data structures to represent display stream 200.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
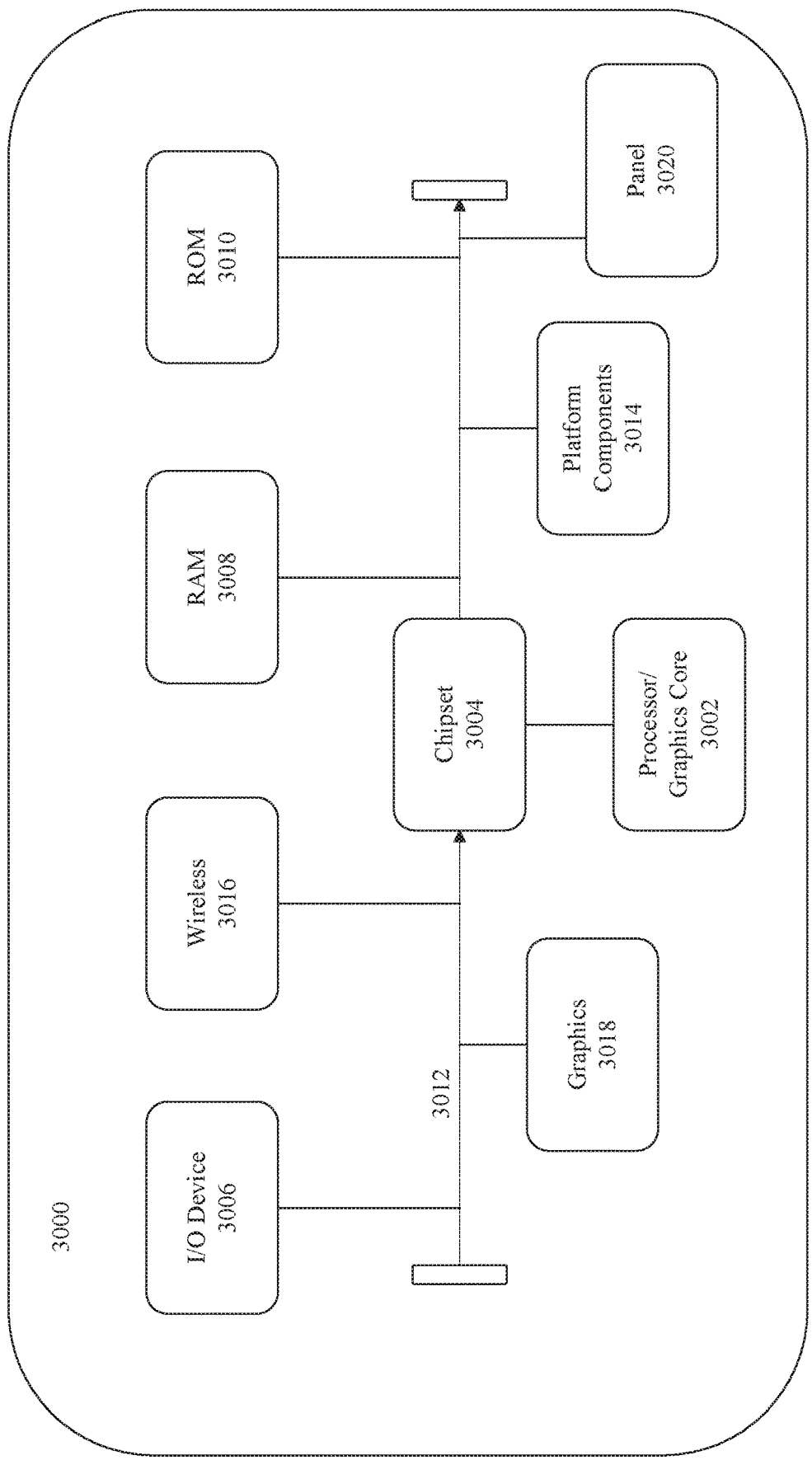
FIG. 7 illustrates one embodiment of a device.

FIG. 7 is a diagram of an exemplary system embodiment and in particular, depicts a platform 3000, which may include various elements. For instance, this figure depicts that platform 3000 (e.g., platform 10, or the like) may include a processor/graphics core 3002, a chipset 3004, an input/output (I/O) device 3006, a random access memory (RAM) (such as dynamic RAM (DRAM)) 3008, and a read only memory (ROM) 3010, panel 3020 (e.g., panel 18, or the like) and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that has a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

The following examples pertain to further embodiments, from which numerous permutations and configurations will be apparent.

Example 1. An apparatus for a display controller, comprising: a processor; memory coupled to the processor, the memory comprising instructions, which when executed by the processor cause the processor to format a link frame, the link frame comprising a link layer control protocol packet and a multi-stream transport packet (MTP) series including a plurality of MTPs; and a transmitter, the transmitter to send the link frame to a panel via a display interconnect.

Example 2. The apparatus of example 1, the memory comprising instruction that when executed by the processor, cause the processor to generate the LLCP packet, the LLCP packet to include indications of control data.

Example 3. The apparatus of example 1, the memory comprising instruction that when executed by the processor, cause the processor to generate the plurality of MTPs, each of the plurality of MTPs to include indications of display data.

Example 4. The apparatus of example 3, the display interconnect a DisplayPort compliant interconnect, the memory comprising instruction that when executed by the processor, cause the processor to: determine whether the DisplayPort compliant interconnect is operating in single stream transport (SST) mode or a multi-stream transport (MST) mode; and generate each of the plurality of MSTs to comprise display data for a single display stream based on a determination that the DisplayPort compliant interconnect is operating in SST mode; or generate each of the plurality of MSTs to comprise display data for a plurality of display streams based on a determination that the DisplayPort compliant interconnect is operating in MST mode.

Example 5. The apparatus of example 1, wherein each of the plurality of MSTs comprise 64 symbols.

Example 6. The apparatus of example 5, wherein each of the plurality of MSTs comprise indications of display data for a first stream represented by symbols 0-19, display data for a second stream represented by symbols 20-39, display data for a third stream represented by symbols 40-59, and padding represented by symbols 60-63.

Example 7. The apparatus of example 1, wherein each of the plurality of MSTs are encoded using an 8b/10b encoding, a 64b/66b encoding, or a 128b/132b encoding.

Example 8. The apparatus of example 7, wherein the MTP series comprises 2^16 symbols.

Example 9. The apparatus of example 1, wherein the LLCP packet comprises 128 bits.

Example 10. At least one machine-readable storage medium comprising instructions that when executed by a processor at a platform coupled to a panel via a display interconnect, cause the processor to: format a link frame, the link frame comprising a link layer control protocol packet and a multi-stream transport packet (MTP) series including a plurality of MTPs; and cause a transmitter to send to the panel, via the display interconnect, the link frame.

Example 11. The at least one machine-readable storage medium of example 10, comprising instructions that further cause the processor to generate the LLCP packet, the LLCP packet to include indications of control data.

Example 12. The at least one machine-readable storage medium of example 10, comprising instructions that further cause the processor to generate the plurality of MTPs, each of the plurality of MTPs to include indications of display data.

Example 13. The at least one machine-readable storage medium of example 12, the display interconnect a DisplayPort compliant interconnect, the medium comprising instructions that further cause the processor to: determine whether the DisplayPort compliant interconnect is operating in single stream transport (SST) mode or a multi-stream transport (MST) mode; and generate each of the plurality of MSTs to comprise display data for a single display stream based on a determination that the DisplayPort compliant interconnect is operating in SST mode; or generate each of the plurality of MSTs to comprise display data for a plurality of display streams based on a determination that the DisplayPort compliant interconnect is operating in MST mode.

Example 14. The at least one machine-readable storage medium of example 13, comprising instruction that further cause the processor to: determine whether the DisplayPort compliant interconnect is operating in single stream transport (SST) mode or a multi-stream transport (MST) mode; and generate each of the plurality of MSTs to comprise display data for a single display stream based on a determination that the DisplayPort compliant interconnect is operating in SST mode; or generate each of the plurality of MSTs to comprise display data for a plurality of display streams based on a determination that the DisplayPort compliant interconnect is operating in MST mode.

Example 15. The at least one machine-readable storage medium of example 10, wherein each of the plurality of MSTs comprise 64 symbols.

Example 16. The at least one machine-readable storage medium of example 15, wherein each of the plurality of MSTs comprise indications of display data for a first stream represented by symbols 0-19, display data for a second stream represented by symbols 20-39, display data for a third stream represented by symbols 40-59, and padding represented by symbols 60-63.

Example 17. The at least one machine-readable storage medium of example 10, wherein each of the plurality of MSTs are encoded using an 8b/10b encoding, a 64b/66b encoding, or a 128b/132b encoding.

Example 18. The at least one machine-readable storage medium of example 17, wherein the MTP series comprises 2^16 symbols.

Example 19. The at least one machine-readable storage medium of example 10, wherein the LLCP packet comprises 128 bits.

Example 20. A display controller comprising: a receiver to receive, via a display interconnect, a link frame from a platform, the link frame comprising a link layer control protocol (LLCP) packet and a multi-stream transport packet (MTP) series including a plurality of MTPs; and circuitry to: configure a display panel based in part on the LLCP; and decode display data from each of the plurality of MTPs.

Example 21. The display controller of example 20, the display interconnect a DisplayPort compliant interconnect, circuitry to: determine whether the DisplayPort compliant interconnect is operating in single stream transport (SST) mode or a multi-stream transport (MST) mode; and provide the decoded display data to a single display region based on a determination that the DisplayPort compliant interconnect is operating in SST mode; or provide portions of the decoded display data to a plurality of display regions, respectively, based on a determination that the DisplayPort compliant interconnect is operating in MST mode.

Example 22. The display controller of example 20, wherein each of the plurality of MSTs comprise 64 symbols.

Example 23. The display controller of example 22, wherein each of the plurality of MSTs comprise indications of display data for a first stream represented by symbols 0-19, display data for a second stream represented by symbols 20-39, display data for a third stream represented by symbols 40-59, and padding represented by symbols 60-63.

Example 24. The display controller of example 20, wherein each of the plurality of MSTs are encoded using an 8b/10b encoding, a 64b/66b encoding, or a 128b/132b encoding.

Example 25. The display controller of example 24, wherein the MTP series comprises 2∧16 symbols.

Example 26. The display controller of example 20, wherein the LLCP packet comprises 128 bits.

Example 27. A method, comprising: formatting a link frame, the link frame comprising a link layer control protocol packet and a multi-stream transport packet (MTP) series including a plurality of MTPs; and causing a transmitter to send to the panel, via the display interconnect, the link frame.

Example 28. The method of example 27, comprising generating the LLCP packet, the LLCP packet to include indications of control data.

Example 29. The method of example 27, comprising generating the plurality of MTPs, each of the plurality of MTPs to include indications of display data.

Example 30. The method of example 29, the display interconnect a DisplayPort compliant interconnect, the method comprising: determining whether the DisplayPort compliant interconnect is operating in single stream transport (SST) mode or a multi-stream transport (MST) mode;

and generating each of the plurality of MSTs to comprise display data for a single display stream based on a determination that the DisplayPort compliant interconnect is operating in SST mode; or generating each of the plurality of MSTs to comprise display data for a plurality of display streams based on a determination that the DisplayPort compliant interconnect is operating in MST mode.

Example 31. The method of example 30, comprising: determining whether the DisplayPort compliant interconnect is operating in single stream transport (SST) mode or a multi-stream transport (MST) mode; and generating each of the plurality of MSTs to comprise display data for a single display stream based on a determination that the DisplayPort compliant interconnect is operating in SST mode; or generating each of the plurality of MSTs to comprise display data for a plurality of display streams based on a determination that the DisplayPort compliant interconnect is operating in MST mode.

Example 32. The method of example 27, wherein each of the plurality of MSTs comprise 64 symbols.

Example 33. The method of example 32, wherein each of the plurality of MSTs comprise indications of display data for a first stream represented by symbols 0-19, display data for a second stream represented by symbols 20-39, display data for a third stream represented by symbols 40-59, and padding represented by symbols 60-63.

Example 34. The method of example 27, wherein each of the plurality of MSTs are encoded using an 8b/10b encoding, a 64b/66b encoding, or a 128b/132b encoding.

Example 35. The method of example 34, wherein the MTP series comprises 2^16 symbols.

Example 36. An apparatus, comprising means arranged to implement the function of any one of examples 27 to 35.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The invention claimed is:

1. An apparatus, comprising:
a processor;
memory coupled to the processor, the memory comprising instructions, which when executed by the processor cause the processor to format a DisplayPort compliant link frame, the link frame comprising a multi-stream transport packet (MTP) series including a plurality of MTPs and at least one link layer control protocol (LLCP) packet inserted at fixed intervals between individual MTPs of the plurality of MTPs, the at least one LLCP packet to include indications of control information for a display stream and the plurality of MTPs to include indications of display data for the display stream; and
a transmitter, the transmitter to send the link frame to a panel via a DisplayPort interconnect.

2. The apparatus of claim 1, the memory comprising instruction that when executed by the processor, cause the processor to generate the LLCP packet.

3. The apparatus of claim 1, the memory comprising instruction that when executed by the processor, cause the processor to generate the plurality of MTPs.

4. The apparatus of claim 3, the memory comprising instruction that when executed by the processor, cause the processor to:
determine whether the DisplayPort compliant interconnect is operating in single stream transport (SST) mode or a multi-stream transport (MST) mode; and
generate each of the plurality of MTPs to comprise display data for a single display stream based on a determination that the DisplayPort compliant interconnect is operating in SST mode; or
generate each of the plurality of MTPs to comprise display data for a plurality of display streams based on a determination that the DisplayPort compliant interconnect is operating in MST mode.

5. The apparatus of claim 1, wherein each of the plurality of MTPs comprise 64 symbols.

6. The apparatus of claim 5, wherein each of the plurality of MTPs comprise indications of display data for a first stream represented by symbols 0-19, display data for a second stream represented by symbols 20-39, display data for a third stream represented by symbols 40-59, and padding represented by symbols 60-63.

7. The apparatus of claim 1, wherein each of the plurality of MTPs are encoded using an 8b/10b encoding, a 64b/66b encoding, or a 128b/132b encoding.

8. The apparatus of claim 7, wherein the MTP series comprises 2^16 symbols.

9. The apparatus of claim 1, wherein the LLCP packet comprises 128 bits.

10. At least one non-transitory machine-readable storage medium comprising instructions that when executed by a processor at a platform coupled to a panel via a DisplayPort interconnect, cause the processor to:
format a DisplayPort compliant link frame, the link frame comprising a multi-stream transport packet (MTP) series including a plurality of MTPs and at least one link layer control protocol (LLCP) packet inserted at fixed intervals between individual MTPs of the plurality of MTPs, the at least one LLCP packet to include indications of control information for a display stream and the plurality of MTPs to include indications of display data for the display stream; and
cause a transmitter to send to the panel, via the DisplayPort interconnect, the link frame.

11. The at least one non-transitory machine-readable storage medium of claim 10, comprising instructions that further cause the processor to generate the LLCP packet.

12. The at least one non-transitory machine-readable storage medium of claim 10, comprising instructions that further cause the processor to generate the plurality of MTPs.

13. The at least one non-transitory machine-readable storage medium of claim 12, the medium comprising instructions that further cause the processor to:
determine whether the DisplayPort compliant interconnect is operating in single stream transport (SST) mode or a multi-stream transport (MST) mode; and
generate each of the plurality of MTPs to comprise display data for a single display stream based on a determination that the DisplayPort compliant interconnect is operating in SST mode; or
generate each of the plurality of MTPs to comprise display data for a plurality of display streams based on a determination that the DisplayPort compliant interconnect is operating in MST mode.

14. A display controller comprising:
a receiver to receive, via a DisplayPort interconnect, a link frame from a platform, the link frame comprising a multi-stream transport packet (MTP) series including a plurality of MTPs and at least one link layer control protocol (LLCP) packet inserted at fixed intervals between individual MTPs of the plurality of MTPs, the at least one LLCP packet to include indications of control information for a display stream and the plurality of MTPs to include indications of display data for the display stream; and
circuitry to:
configure a display panel based in part on the LLCP packet; and
decode display data from each of the plurality of MTPs.

15. The display controller of claim 14, the circuitry to:
determine whether the DisplayPort interconnect is operating in single stream transport (SST) mode or a multi-stream transport (MST) mode; and
provide the decoded display data to a single display region based on a determination that the DisplayPort interconnect is operating in SST mode; or
provide portions of the decoded display data to a plurality of display regions, respectively, based on a determination that the DisplayPort interconnect is operating in MST mode.

16. The display controller of claim 14, wherein each of the plurality of MTPs comprise 64 symbols.

17. The display controller of claim 16, wherein each of the plurality of MTPs comprise indications of display data for a first stream represented by symbols 0-19, display data for a second stream represented by symbols 20-39, display data for a third stream represented by symbols 40-59, and padding represented by symbols 60-63.

18. The display controller of claim 14, wherein each of the plurality of MTPs are encoded using an 8b/10b encoding, a 64b/66b encoding, or a 128b/132b encoding.

19. The display controller of claim 18, wherein the MTP series comprises $2^{16}$ symbols.

20. The display controller of claim 14, wherein the LLCP packet comprises 128 bits.

* * * * *